(12) United States Patent
Janoska et al.

(10) Patent No.: US 7,551,549 B1
(45) Date of Patent: Jun. 23, 2009

(54) METHOD AND APPARATUS FOR LINE CARD REDUNDANCY IN A COMMUNICATION SWITCH

(75) Inventors: Mark William Janoska, Carleton Place (CA); Henry Chow, Kanata (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 0 days.

(21) Appl. No.: 09/275,934

(22) Filed: Mar. 24, 1999

(51) Int. Cl.
*H04L 12/26* (2006.01)
(52) U.S. Cl. ..................................... 370/217
(58) Field of Classification Search ......... 370/218–220, 370/225, 242–245, 419, 463
See application file for complete search history.

(56) References Cited

U.S. PATENT DOCUMENTS

| | | | |
|---|---|---|---|
| 5,179,552 A | | 1/1993 | Chao |
| 5,198,808 A | * | 3/1993 | Kudo ........................ 340/2.22 |
| 5,398,235 A | * | 3/1995 | Tsuzuki et al. .............. 370/219 |
| 5,596,569 A | * | 1/1997 | Madonna .................... 370/217 |
| 5,706,277 A | * | 1/1998 | Klink ........................ 370/220 |
| 5,854,786 A | * | 12/1998 | Henderson et al. .......... 370/335 |
| 5,903,544 A | * | 5/1999 | Sakamoto et al. ........... 370/218 |
| 5,909,427 A | * | 6/1999 | Manning et al. ............. 370/219 |
| 5,953,314 A | * | 9/1999 | Ganmukhi et al. .......... 370/220 |
| 5,999,621 A | * | 12/1999 | Martin et al. ................ 379/438 |
| 6,031,838 A | * | 2/2000 | Okabe et al. ............. 370/395.6 |
| 6,075,767 A | * | 6/2000 | Sakamoto ................... 370/228 |
| 6,081,530 A | * | 6/2000 | Wiher et al. ............. 370/395.53 |
| 6,091,731 A | * | 7/2000 | Biegaj et al. .............. 370/235.1 |
| 6,118,786 A | | 9/2000 | Tiernan et al. |
| 6,122,273 A | * | 9/2000 | Cantwell et al. ............. 370/359 |
| 6,169,726 B1 | * | 1/2001 | Dempsey et al. ............ 370/219 |
| 6,487,210 B1 | | 11/2002 | Janoska et al. |
| 6,617,879 B1 | * | 9/2003 | Chung ......................... 326/82 |

\* cited by examiner

*Primary Examiner*—Chi H. Pham
*Assistant Examiner*—Thai D. Hoang

(57) ABSTRACT

A method and apparatus for line card redundancy in a communication switch is presented. The switch includes an arbiter coupled to the input of a switch core and a line card pair. The first line card of the line card pair is considered an active line card, whereas the second line card of the line card pair is considered the redundant, or inactive, line card. The active and inactive line cards are determined based on selection information received by the arbiter. Based on the selection information, the arbiter preferentially provides ingress data from the active line card to the corresponding input of the switch core. A router is coupled to the line card pair and to an output of the switch core. The router passes egress data from the switch core to at least one of the first and second line cards based on routing information included in the egress data.

26 Claims, 5 Drawing Sheets

METHOD AND APPARATUS FOR LINE CARD REDUNDANCY IN A COMMUNICATION SWITCH

TECHNICAL FIELD OF THE INVENTION

The invention relates generally to communication systems and more particularly to a method and apparatus for line card redundancy in switches used in such communication systems.

BACKGROUND OF THE INVENTION

Communication between a calling party and a called party may be established over a communication network. Such a communication network may include a plurality of network switches that transport data. In typical cell-based and packet-based communication networks, these switches include a switch core and a number of line cards. Each of the line cards provides a communication link to another switch in the network. The switch core allows inputs received from one line card to be provided on the output of another line card. This flexible routing of data allows for efficient communication between the various switches in the network.

In operation, line cards within a switch may experience faults or other errors that cause the line card to fail. In such instances, it is desirable to have a redundant line card that can be switched into an active mode and utilized to insure that data communication with the network is not interrupted. However, in order to provide a redundant line card for each line card in the system, prior art systems required that the effective bandwidth of the overall switch be cut in half. This is due to the fact that switch cores within the switch are only able to couple to a limited number of line cards. As such, if redundant line cards are included in the system, some of the coupling capabilities of the switch core will be consumed by these redundant line cards. As the redundant line cards are only utilized in the event of a problem with the normally active line cards, the bandwidth of the overall switch is effectively halved.

Another prior art solution includes an additional switch core in the system, where the additional switch core is coupled to a complete array of line cards. These line cards are coupled to the external data connections in the same manner as the line cards of the original switch core. When an error occurs with one of the line cards coupled to the original switch core, the entire system switches over to utilize the additional switch core provided in the system. However, this transition effectively eliminates any future redundancy for all of the line cards in the system. In addition to this, including an additional switch core within the switch adds to the cost and complexity of the switch.

Therefore, a need exists for a method and apparatus for providing line card redundancy in a communication switch without reducing the effective bandwidth of the switch.

DETAILED DESCRIPTION OF A PREFERRED EMBODIMENT

Generally, the present invention provides a method and apparatus for line card redundancy in a communication switch. An arbiter is coupled to the input of the switch core where a single line card would be coupled in a prior art solution. The arbiter in turn is coupled to a line card pair where a first line card of the line card pair is considered an active line card, whereas the second line card of the line card pair is considered the redundant, or inactive, line card. The active and inactive line cards are determined based on selection information received by the arbiter. Based on the selection information, the arbiter preferentially provides ingress data from the active line card to the corresponding input of the switch core. A router is coupled to the line card pair and to an output of the switch core. The router passes egress data from the switch core to at least one of the first and second line cards based on routing information included in the egress data. By enabling an input and output of the switch core to couple to more than one line card, redundancy can be established without removing effective bandwidth from the communication switch. If a failure on an active line card or other error occurs, selection information can be provided to the arbiter to indicate that it should pass ingress data from the newly activated, formerly redundant line card.

Figure 1:
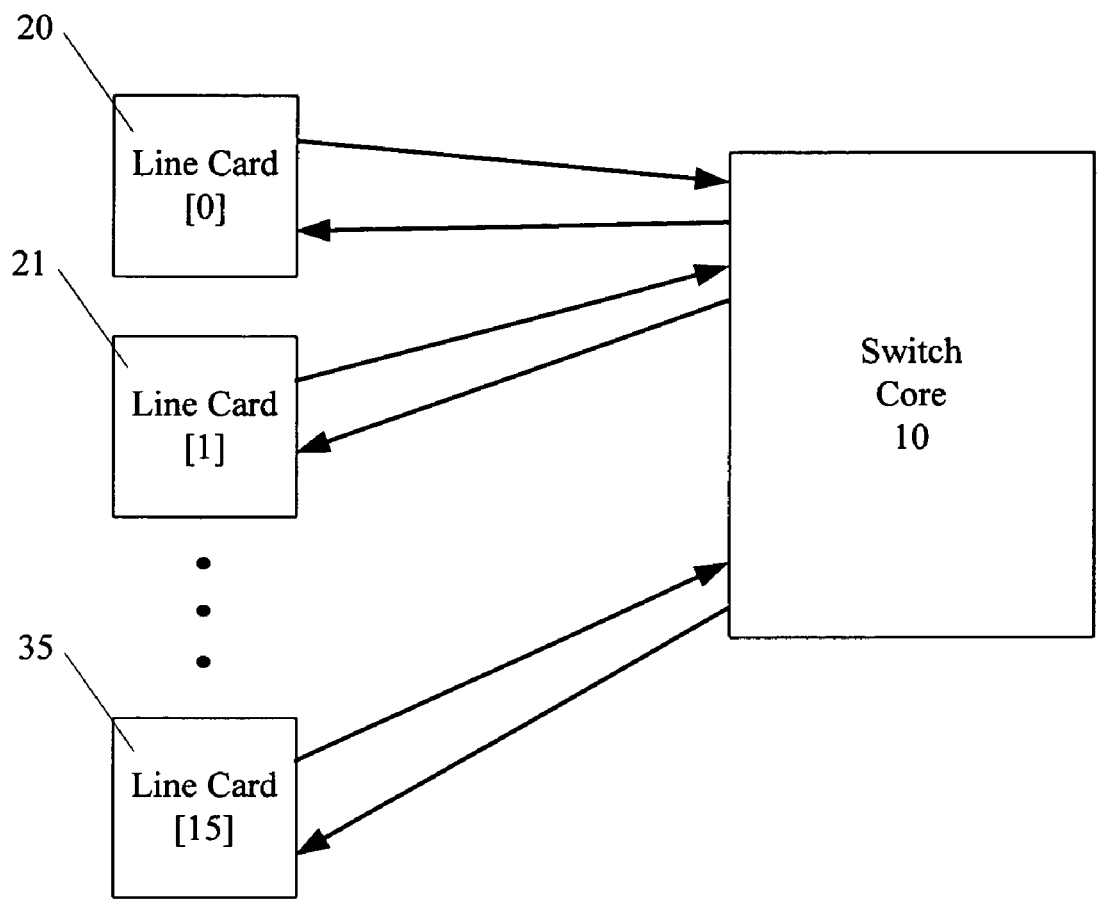
FIG. 1 illustrates a prior art communication switch.

The invention can be better understood with reference to FIGS. 1-6. FIG. 1 illustrates a switch core 10 operably coupled to a plurality of line cards 20-35. Each of the line cards provides ingress data to the switch core 10 and receives egress data from the switch core 10. In this prior art solution, the redundancy only exists if only a portion of the line cards is used as active line cards at any one time. Thus, if line card 20 is designated an active line card, and fails for some reason, line card 21 may be utilized as a replacement for the defective line card. Although this may allow the switch to continue operating, it effectively halves the bandwidth of the switch in operation.

Figure 2:
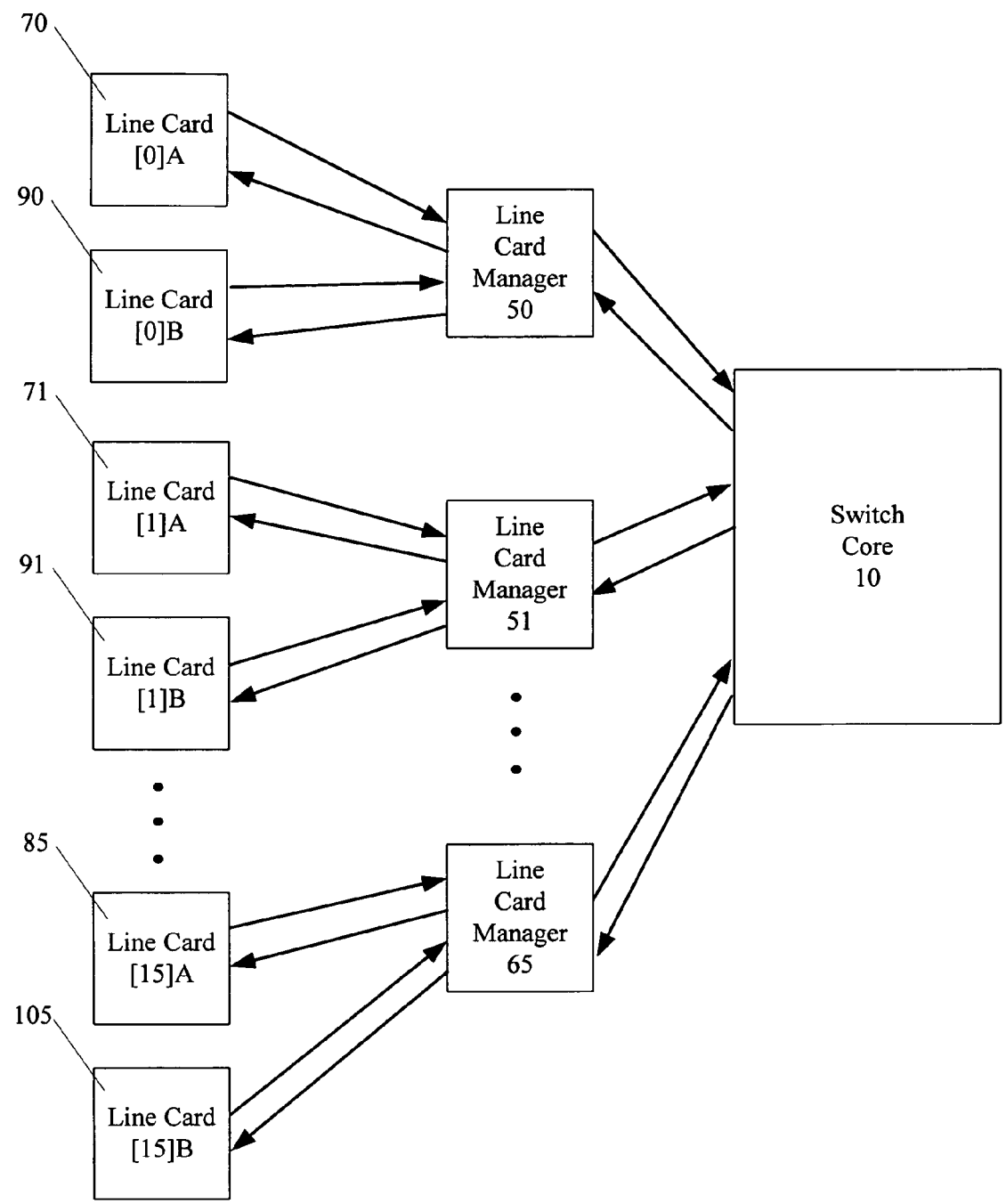
FIG. 2 illustrates a block diagram of a communication switch in accordance with the present invention.

FIG. 2 illustrates a switch that provides redundancy yet does not compromise any bandwidth. The system includes the switch core 10, a plurality of line card managers 50-65, a plurality of active line cards 70-85, and a plurality of initially redundant line cards 90-105. Each of the line card managers 50-65 allows the switch core 10 to couple to a pair of line cards. One line card of the line card pair is designated as an active line card, which may be the line cards 70-85. The active line card will be utilized until some fault or error causes the line card manager to switch from the active line card to the formerly inactive line card. Thus, the line cards 90-105 are initially set up as inactive line cards and are provided for redundancy.

The switch core 10 of FIG. 2 is preferably a N×N switch core that has N inputs and N outputs. The switch core 10 passes data received from the inputs to the outputs based on routing tags. More preferably, the switch core 10 is a 16×16 switch core that, through the use of the line card managers 50-65, is able to couple to 32 line cards. For other values of N, the number of line cards to which the switch core is able to couple is preferably equal to (2*N). The redundant line card switch illustrated in FIG. 2 may be utilized in either a cell-based or a packet-based network, and most preferably is utilized in an asynchronous transfer mode (ATM) network.

Figure 3:
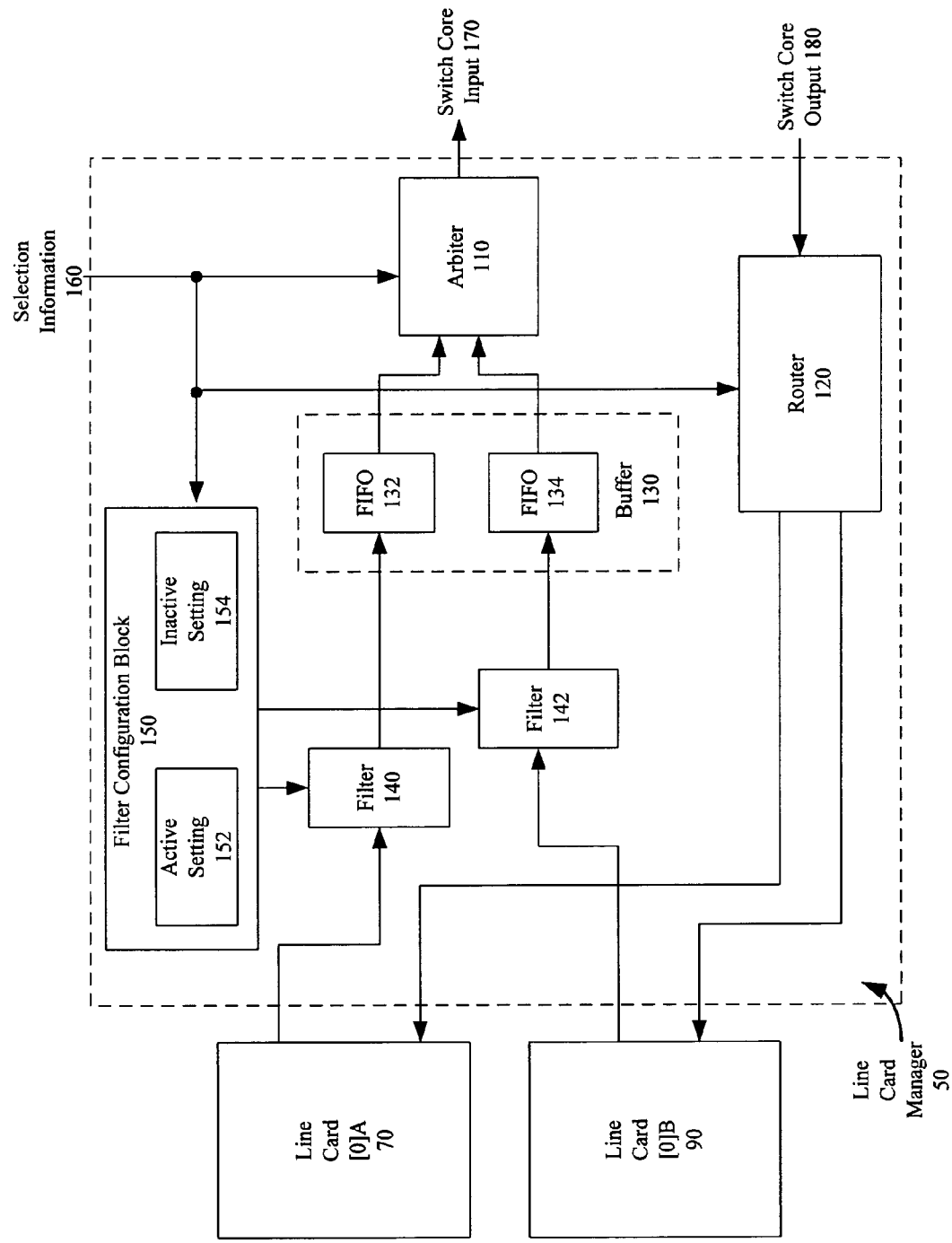
FIG. 3 illustrates a block diagram of a line card manager in accordance with the present invention.

FIG. 3 illustrates a more detailed view of the line card manager 50 coupled to line cards 70 and 90. The line card manager 50 includes an arbiter 110, a router 120, and preferably includes a buffer 130 and filters 140 and 142. The arbiter 110 is operably coupled to the first line card 70 and the second line card 90. The arbiter 110 is also coupled to an input 170 of the switch core. The arbiter provides ingress data received from one of the first and second line cards to the corresponding input of the switch core based on selection information 160. Preferably, the selection information 160 determines an active line card from the first and second line cards 70 and 90. The arbiter will preferentially pass the data from the active line card before it passes inactive line card data. More preferably, the arbiter 110 will only pass inactive line card data when idle cells or packets are included in the active line card data.

Although the amount of data passed by the inactive line card is preferably minimal, enough data may be permitted to pass from the inactive line card to perform diagnostic and other low bandwidth applications. In order to insure that some inactive line card data is passed through to the switch core input 170, the active line card may intentionally insert idle cells into its data stream.

A buffer 130 may be included in the system upstream from the arbiter 110 such that data cells from the line cards 70 and 90 can be held until it is possible for the arbiter 110 to pass them to the switch core input 170. Preferably, the buffer 130 includes a first-in/first-out (FIFO) buffer corresponding to each of the line cards. The FIFO 132 will buffer ingress data received from the line card 70, whereas the FIFO 134 will buffer ingress data received from the line card 90. The size or capacity of the FIFOs may be determined based on whether the line card to which the FIFO corresponds is normally utilized as the active or inactive line card. If the line card is typically inactive, the FIFO may be smaller than that of the active line card. More preferably, the FIFO corresponding to the inactive line card may be sized based on the number of idle cells typically passed by the active line card, as this determines how often data from the inactive FIFO will be passed to the switch core.

Filters 140 and 142 may also be included in the ingress data path of the line cards 70 and 90. The filters 140 and 142 are preferably configured by a filter configuration block 150. The filters 140 and 142 may be used to insure that only relevant data from the line cards 70 and 90 is presented to the buffer 130. More preferably, the filters 140 and 142 are configured based on their coupling to an active or inactive line card such that a filter corresponding to an active line card passes data that is expected to be passed through to the switch core input 170. A filter corresponding to an inactive line card will most likely filter out the majority of data, only passing data relevant to diagnostic or other low bandwidth applications. In order to configure the filters in such a manner, registers may be included in the filter configuration block 150 that are selected and used to configure the filters 140 and 142 based on whether they couple to an active or inactive line card. Thus, the selection information 160 may be routed to the filter configuration block 150 such that it selects either an active setting register 150 or an inactive setting register 154 to configure a particular filter.

Figure 4:
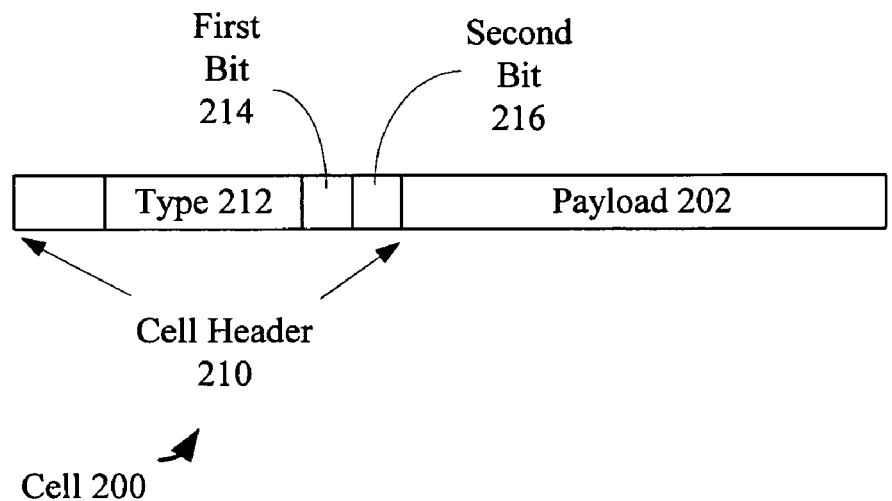
FIG. 4 illustrates a block diagram of a cell that may be used in conjunction with the switch of FIG. 2.

The determination of whether or not a filter will pass a certain data cell or packet may be based on the data type of the received data cell. The data type may indicate whether the data would be relevant to an active line card or an inactive line card. Referring to FIG. 4, the data type is preferably determined based on a type field included in the header of a data cell or packet. FIG. 4 shows a data cell 200 that includes a cell header 210 and a payload 202. Included in the cell header 210 is a type field 212 that may be used by the filters 140 and 142 to determine whether or not the data cell should be passed through to the buffer 130. Thus, the active and inactive settings 152 and 154 configure the filters 140 and 142 such that they pass selected data types and reject other data types.

Returning to FIG. 3, egress data from the switch core output 180 is directed by the router 120 to one or more of the line cards 70 and 90. Preferably, the router 120 will redirect the egress data to both of the line cards 70 and 90 such that if a problem does occur, the transition from one line card to the other will be smooth. In order to determine to which of the line cards 70 and 90 to provide the egress data, the router 120 examines routing information included in the egress data. Preferably, a bit is included in the header of the egress data cells that corresponds to each of the line cards, and when a bit is set to a valid state, the router 120 will provide the egress data to the particular line card corresponding to that bit.

Returning to FIG. 4, it can be seen that the cell header 210 includes a first bit 214 and a second bit 216. In one embodiment, the first bit 214 corresponds to the line card 70, and the second bit 216 corresponds to the line card 90. When the first bit is set to a valid state, egress data will be passed to the line card 70, and when the second bit 216 is set to a valid state, egress data will be passed to the line card 90. This enables data to be selectively passed to one or both of the line cards 70 and 90.

In another embodiment, the first bit 214 is known to correspond to the active line card, whereas the second bit 216 is known to correspond to the inactive line card. Thus, when the first bit 214 is set, the egress data will be passed to the active line card, which may be line card 70 or 90 based on the selection information 160. Similarly, the second bit 216 will correspond to the inactive line card as determined by the selection information 160. Thus, if the first bit in this embodiment were set to a valid state, the data would be passed to the active line card and if the second bit 216 is set, the data is passed to the inactive line card.

It should be noted that in both embodiments that use the two-bit routing information to control distribution of the egress data, data can be provided to either one of the line cards 70 or 90 or to both of the line cards 70 and 90 based on the settings of the two bits. This is preferable to utilizing a single bit to determine which of the line cards is provided with the egress data, where one bit state corresponds to one line card and the other bit state corresponds to the other line card. Such an embodiment would only allow the egress data to be passed to one or the other of the line cards, which may not be desirable.

Figure 5:
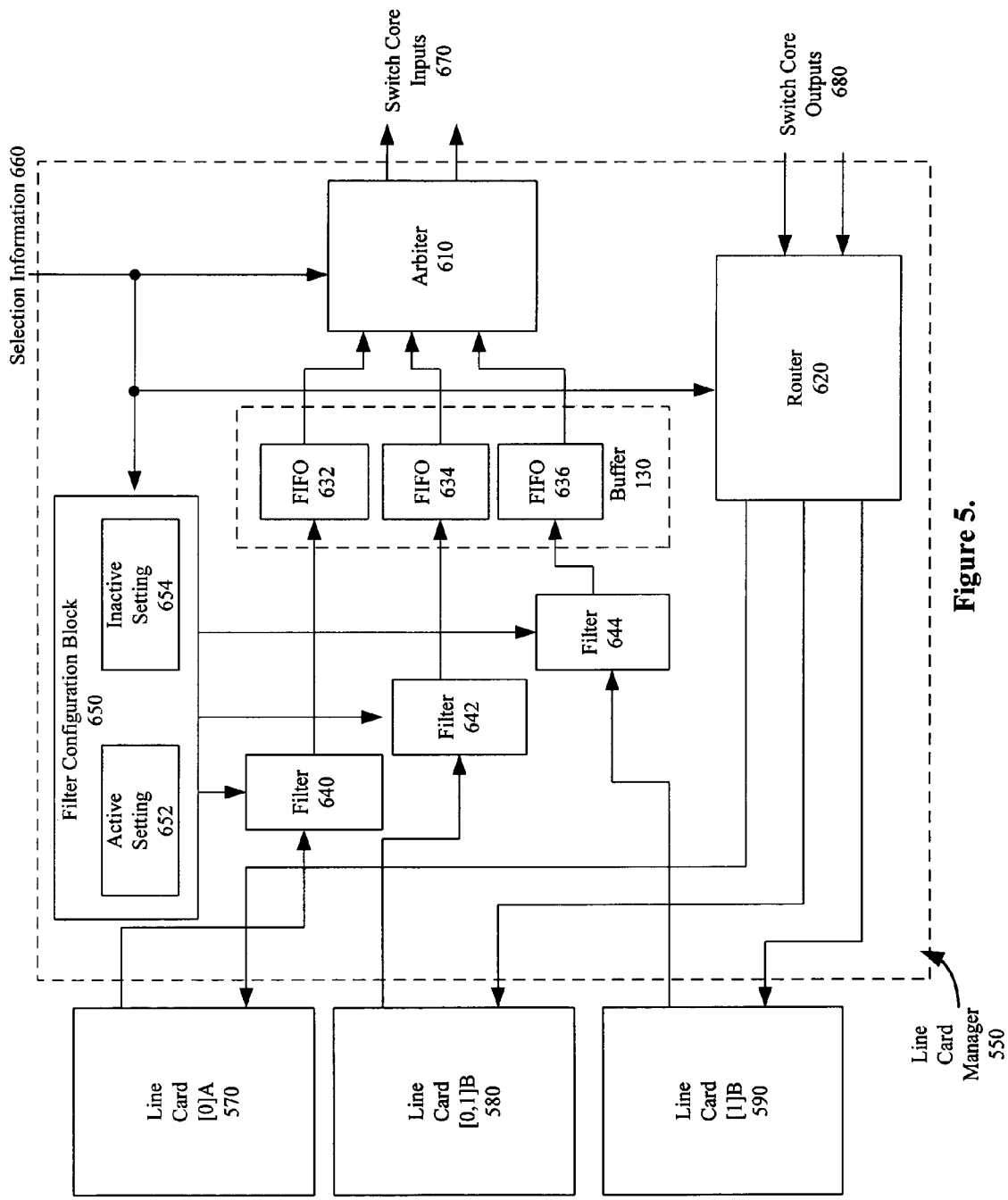
FIG. 5 illustrates a block diagram of another line card manager in accordance with the present invention.

Although the preferred embodiment of FIGS. 2 and 3 illustrates one redundant line card for each active line card in the system, in order to conserve resources, a single line card may be used as the redundant line card for more than one active line card. FIG. 5 illustrates an embodiment that includes three line cards 570, 580, and 590 that are coupled to two switch core inputs 670 and two switch core outputs 680. The line card manager 550 is used control the flow of ingress and egress data between the line cards 570, 580, and 590 and the switch core inputs 670 and outputs 680. In the example illustrated, the line card 570 is preferably the active line card coupled to the input [0] of the switch core. Similarly, the line card 590 is preferably the active line card coupled to the switch core input [1]. These line cards are also coupled to receive the corresponding egress data from the respective switch core outputs 680.

The line card 580 is included in the system as a redundant line card which is shared by the line cards 570 and 590. In order to utilize the line card 580 as a shared redundant resource, an arbiter 610 is included that is operably coupled to all three of the line cards 570, 580, and 590. The arbiter 610 determines which of the line cards are active based on selection information 660 and routes ingress data from these active line cards to the corresponding switch core inputs 670. Similarly, the router 620 determines which of the line cards 570, 580, and 590 are to receive egress data corresponding to two of the outputs from the switch core. In the embodiment illustrated, a two-bit quantity may still be included as routing information in the header, wherein the two-bit quantity selects between the active line card for an output and the shared redundant line card. Data cells corresponding to one of the active line cards may be provided to the shared line card, such that if that particular active line card fails, the transition will be smooth. In the case where the other active line card fails, the changeover to the redundant line card may require some type of initialization or start-up operations. Alternatively, a three-bit quantity may be included as routing information in the header of a cell such that the router 620 may distribute a particular data cell to any one or more of the three line cards based on this routing information.

As before, the ingress data path preferably includes a buffer 130 that may include individual FIFOs 632, 634, and 636 corresponding to each of the ingress data paths. Similarly, filters 640, 642, and 644 may be included in the ingress data paths such that ingress data is passed based on its data type as determined by the type field in the cell header. As before, these filters may be configured using a filter configuration block 650 that includes active and inactive settings that are preferably stored in registers 652 and 654.

It should be noted that the ratio of active line cards to redundant line cards should be based on the particular network in which the line cards are utilized, and the example illustrated in FIG. 5 is merely for illustration purposes. Thus, three active line cards may share a single redundant line card, or five line cards may share three redundant line cards, etc. Similarly, in the embodiment illustrated in FIG. 2, all of the line cards in the system may not include a redundant line card, such that only a portion of the line cards in a particular switch have a potential for a redundant back-up.

Figure 6:
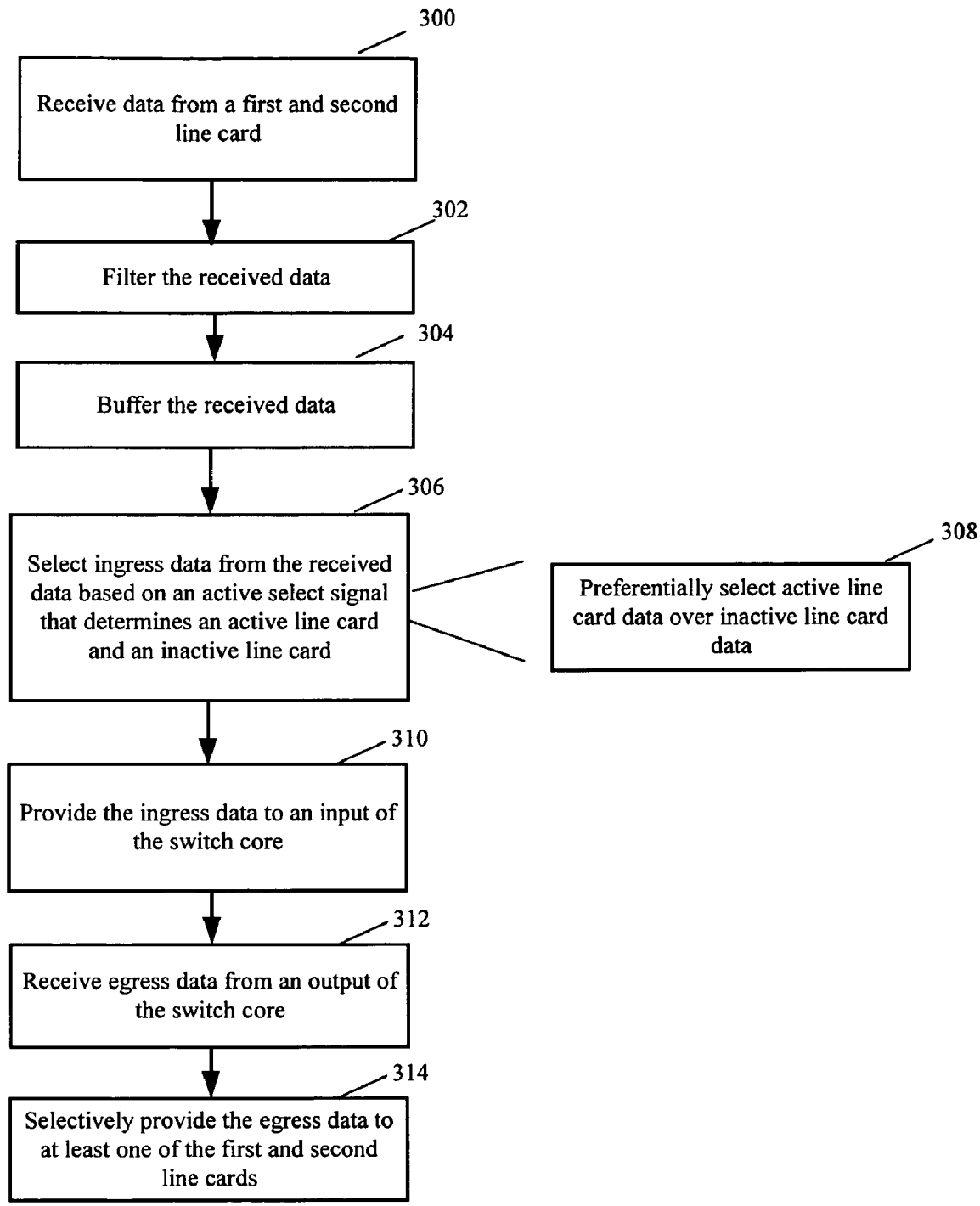
FIG. 6 illustrates a flow diagram of a method for managing line cards in accordance with the present invention.

FIG. 6 illustrates a flow diagram of a method for managing line cards in a system that includes redundant line cards. The method begins at step 300 where data is received from a first line card and a second line card. As was described with respect to FIGS. 3 and 5, the ingress data may be filtered at step 302 based on its data type. At step 304, the ingress data is buffered. Preferably, this is accomplished using FIFOs as was described earlier. The filtering performed at step 302 can insure that only relevant inactive line card data is passed through to the inactive line card buffer, which may be of limited size. This enables diagnostics information of a certain data type to be passed through and buffered without being overwhelmed and pushed out of the limited sized buffer by other data types.

At step 306, ingress data is selected from the received data based on an active select signal. The active select signal determines an active line card and an inactive line card from the first and second line cards. Preferably, the ingress data is selected based on step 308, such that active line card data is preferentially selected over inactive line card data. Thus, as was described earlier, the line card data corresponding to the active line card will be passed unless idle data cells are included in the data stream, in which case inactive line card data may be allowed to trickle through. This small amount of bandwidth provided to the inactive line card may allow for diagnostics or other low bandwidth applications to be maintained.

At step 310, the ingress data is provided to an input of the switch core. As before, the switch core preferably includes a plurality of inputs and a plurality of outputs where data received on the inputs is passed to any one of the outputs based on routing tags included in the data cells.

At step 314, egress data is received from an output of the switch core. At step 314, this egress data is selectively provided to at least one of the first and second line cards based on routing information included in the egress data. Preferably, the routing information included in the egress data is a two-bit quantity, where one bit corresponds to one of the line cards and the bit corresponds to the other line card. In one embodiment, the first bit will correspond to a particular line card, whereas in another embodiment, the first bit will correspond to the active line card. Similarly, the second bit will either correspond to another particular line card or to the inactive line card. Note that the ordering of these two bits is arbitrary. When a bit is set to the active state, the egress data will be passed to the line card to which it corresponds.

The present invention overcomes the limitations of the prior art, which forced a reduction in effective bandwidth of a switch when redundant line cards were included. In a prior art implementation that included 16 line cards coupled to a 16×16 switch core, only eight of the line cards could be active, and the other eight were regulated to redundant status. This is inefficient use of bandwidth in the system, and increases costs in packet- and cell-based networks.

The present invention allows for a means to couple 32 full-capacity line cards to a single 16×16 switch core. The ingress data to a particular input of the 16×16 switch core is selected from two line card inputs, each of which includes a FIFO for buffering purposes. An active line card is chosen from the two line cards, and an arbiter is included which preferentially passes data from the active line card. Preferably, the arbiter only passes inactive line card data when idle data cells are included in the active line card data stream.

Thus, the present invention allows for line card redundancy without compromising overall bandwidth of a switch. It should be understood that the implementation of other variations and modifications of the invention in its various aspects should be apparent to those of ordinary skill, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A switch, comprising:
   a switch core, wherein the switch core has a plurality of inputs and a plurality of outputs, wherein the switch core passes data received on the plurality of inputs to the plurality of outputs based on routing tags; and
   a plurality of line card managers operably coupled to the switch core and adapted to couple to a plurality of line card pairs, wherein each line card manager includes:
      an arbiter that couples to a first line card and a second line card of a line card pair, wherein each line card manager couples to a different line card pair, wherein each arbiter is operably coupled to a corresponding input of the plurality of inputs of the switch core, wherein the arbiter provides ingress data from one of the first and second line cards to the corresponding input to the switch core based on selection information; and
      a router operably coupled to a corresponding output of the plurality of outputs of the switch core, wherein the router couples to the first line card and the second line card, and wherein the router uses routing information included in the egress data from the corresponding output to determine to which among the following group the egress data is provided: the first line card, the second line card, and both the first and the second line cards.

2. The switch of claim 1, wherein each line card manager further comprises buffering circuitry operably coupled to the arbiter, wherein the buffering circuitry buffers ingress data from the first and second line cards, wherein the arbiter provides ingress data from the buffering circuitry to the switch core based on the selection information.

3. The switch of claim 2, wherein the buffering circuitry further comprises a first buffer and a second buffer, wherein the first buffer couples to the first line card, wherein the second buffer couples to the second line card, and wherein the first and second buffers are first in first out buffers.

4. The switch of claim 1, wherein the selection information determines an active line card of the line card pair and an inactive line card, wherein the arbiter preferentially passes active line card data over inactive line card data.

5. The switch of claim 4, wherein when idle states are present in the active line card data, the arbiter passes inactive line card data.

6. The switch of claim 4, wherein the routing information included in the egress data further comprises a first bit and a second bit, wherein when the first bit is active the egress data is provided to the active line card, and wherein when the second bit is active, the egress data is provided to the inactive line card.

7. The switch of claim 4, wherein each line card manager further comprises filters operably coupled to the arbiter, wherein the filters pass selected data types and reject other data types.

8. The switch of claim 7, wherein filters are configured based on a register that determines the selected data types.

9. The switch of claim 8, wherein each line card manager includes an active register and an inactive register, wherein the active register configures a filter corresponding to the active line card, and the inactive register configures a filter corresponding to the inactive line card.

10. The switch of claim 1, wherein the routing information included in the egress data further comprises a first bit and a second bit, wherein when the first bit is active the egress data is provided to the first line card, and wherein when the second bit is active, the egress data is provided to the second line card.

11. The switch of claim 1, wherein the switch core further comprises a N×N switch core and the plurality of line cards includes 2N line cards.

12. The switch of claim 1 further comprises a switch for use in a cell based network.

13. The switch of claim 1 further comprises a switch for use in a packet based network.

14. The switch of claim 13 further comprises an asynchronous transfer mode switch.

15. A switch, comprising:
a switch core, wherein the switch core has a plurality of inputs and a plurality of outputs, wherein the switch core passes data received on the plurality of inputs to the plurality of outputs based on routing tags; and
a plurality of line card managers operably coupled to the switch core, wherein each line card manager includes:
an arbiter that couples to a plurality of line cards, wherein each line card manager couples to a different plurality of line cards, wherein each arbiter is operably coupled to a corresponding portion of the plurality of inputs of the switch core, wherein quantity of line cards to which a line card manager couples is greater than quantity of inputs to which the line card manager is coupled, wherein the arbiter provides ingress data from a line card of the plurality of line cards to which it couples to each input to which it is coupled based on selection information, wherein each line card manager further comprises buffering circuitry operably coupled to the arbiter, wherein the buffering circuitry buffers ingress data from the plurality of line cards to which the line card manager couples, wherein the arbiter provides ingress data from the buffering circuitry to the switch core based on the selection information; and
a router operably coupled to a corresponding portion of the plurality of outputs of the switch core, wherein the router couples to the plurality of line cards, wherein the router provides egress data from each output of the corresponding portion of the plurality of outputs to at least one of the plurality of line cards coupled to the line manager within which the router is included based on routing information included in the egress data.

16. The switch of claim 15, wherein the selection information determines active line cards and inactive line cards of the plurality of line cards, wherein the arbiter preferentially passes active line card data over inactive line card data.

17. A method for managing line cards in a system that includes redundant line cards, comprising:
selecting ingress data from data received from a first line card and a second line card, wherein selecting is based on an active select signal, wherein the active select signal determines an active line card and an inactive line card from the first and second line cards;
providing the ingress data to an input of a switch core, wherein the switch core includes a plurality of inputs and a plurality of outputs;
receiving egress data from one of the plurality of outputs of the switch core
using routing information included in the egress data to determine to which among the following group the egress data is provided: the first line card, the second line card, and both the first and the second line cards; and
filtering the data received from the first and second line cards based on which is the active line card.

18. The method of claim 17 further comprises buffering the data received from the first and second line cards prior to selecting the ingress data.

19. The method of claim 17, wherein selecting the ingress data further comprises preferentially selecting active line card data over inactive line card data, wherein inactive line card data is selected when idle data is provided by the active line card.

20. The method of claim 19, wherein selectively providing the egress data further comprises providing the egress data based on a first bit and a second bit, wherein when the first bit is active, the egress data is provided to the first line card, and wherein when the second bit is active, the egress data is provided to the second line card.

21. The method of claim 19, wherein selectively providing the egress data further comprises providing the egress data based on a first bit and a second bit, wherein when the first bit is active, the egress data is provided to the active line card, and wherein when the second bit is active, the egress data is provided to the inactive line card.

22. A method for managing line cards in a system that includes redundant line cards, comprising:
- selecting ingress data from data received from a first line card and a second line card, wherein selecting is based on an active select signal, wherein the active select signal determines an active line card and an inactive line card from the first and second line cards;
- providing the ingress data to an input of a switch core, wherein the switch core includes a plurality of inputs and a plurality of outputs;
- receiving egress data from one of the plurality of outputs of the switch core; and
- selectively providing the egress data to at least one of the first and second line cards based on a first bit and a second bit of routing information included in the egress data, wherein when the first bit is active, the egress data is provided to the first line card, and wherein when the second bit is active, the egress data is provided to the second line card.

23. A method for managing line cards in a system that includes redundant line cards, comprising:
- selecting ingress data from data received from a first line card and a second line card, wherein selecting is based on an active select signal, wherein the active select signal determines an active line card and an inactive line card from the first and second line cards;
- providing the ingress data to an input of a switch core, wherein the switch core includes a plurality of inputs and a plurality of outputs;
- receiving egress data from one of the plurality of outputs of the switch core; and
- selectively providing the egress data to at least one of the first and second line cards based on a first bit and a second bit of routing information included in the egress data, wherein when the first bit is active, the egress data is provided to the active line card, and wherein when the second bit is active, the egress data is provided to the inactive line card.

24. A switch, comprising:
- a switch core, wherein the switch core has a plurality of inputs and a plurality of outputs, wherein the switch core passes data received on the plurality of inputs to the plurality of outputs based on routing tags; and
- a plurality of line card managers operably coupled to the switch core and adapted to couple to a plurality of line card pairs, wherein each line card manager includes:
  - an arbiter that couples to a first line card and a second line card of a line card pair, wherein each line card manager couples to a different line card pair, wherein each arbiter is operably coupled to a corresponding input of the plurality of inputs of the switch core, wherein the arbiter provides ingress data from one of the first and second line cards to the corresponding input to the switch core based on selection information; and
- a router operably coupled to a corresponding output of the plurality of outputs of the switch core, wherein the router couples to the first line card and the second line card, and wherein the router provides egress data from the corresponding output to at least one of the first and second line cards based on routing information included in the egress data, wherein the routing information further comprises a first bit and a second bit, wherein when the first bit is active the egress data is provided to the active line card, and wherein when the second bit is active, the egress data is provided to the inactive line card.

25. A switch, comprising:
- a switch core, wherein the switch core has a plurality of inputs and a plurality of outputs, wherein the switch core passes data received on the plurality of inputs to the plurality of outputs based on routing tags; and
- a plurality of line card managers operably coupled to the switch core and adapted to couple to a plurality of line card pairs, wherein each line card manager includes:
  - an arbiter that couples to a first line card and a second line card of a line card pair, wherein each line card manager couples to a different line card pair, wherein each arbiter is operably coupled to a corresponding input of the plurality of inputs of the switch core, wherein the arbiter provides ingress data from one of the first and second line cards to the corresponding input to the switch core based on selection information; and
  - a router operably coupled to a corresponding output of the plurality of outputs of the switch core, wherein the router couples to the first line card and the second line card, and wherein the router provides egress data from the corresponding output to at least one of the first and second line cards based on routing information included in the egress data, wherein the routing information further comprises a first bit and a second bit, wherein when the first bit is active the egress data is provided to the first line card, and wherein when the second bit is active, the egress data is provided to the second line card.

26. A switch, comprising:
- a switch core, wherein the switch core has a plurality of inputs and a plurality of outputs, wherein the switch core passes data received on the plurality of inputs to the plurality of outputs based on routing tags; and
- a plurality of line card managers operably coupled to the switch core and adapted to couple to a plurality of line card pairs, wherein each line card manager includes:
  - an arbiter that couples to a first line card and a second line card of a line card pair, wherein each line card manager couples to a different line card pair, wherein each arbiter is operably coupled to a corresponding input of the plurality of inputs of the switch core, wherein the arbiter provides ingress data from one of the first and second line cards to the corresponding input to the switch core based on selection information, wherein the selection information determines an active line card of the line card pair and an inactive line card of the line card pair;
  - a router operably coupled to a corresponding output of the plurality of outputs of the switch core, wherein the router couples to the first line card and the second line card, and wherein the router provides egress data from the corresponding output to at least one of the first and second line cards based on routing information included in the egress data;
  - a filter corresponding to the active line card, wherein the filter corresponding to the active line card is operably coupled to the arbiter;
  - a filter corresponding to the inactive line card, wherein the filter corresponding to the inactive line card is operably coupled to the arbiter;
  - an active register, wherein the active register configures the filter corresponding to the active line card; and
  - an inactive register, wherein the inactive register configures the filter corresponding to the inactive line card.

* * * * *